United States Patent
Burns

(10) Patent No.: US 9,033,352 B2
(45) Date of Patent: May 19, 2015

(54) YARD MAINTENANCE VEHICLE WITH CABLE STEERING ASSEMBLY

(75) Inventor: Duncan Burns, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/360,065

(22) PCT Filed: Nov. 22, 2011

(86) PCT No.: PCT/US2011/061793
§ 371 (c)(1),
(2), (4) Date: May 22, 2014

(87) PCT Pub. No.: WO2013/077852
PCT Pub. Date: May 30, 2013

(65) Prior Publication Data
US 2014/0291954 A1  Oct. 2, 2014

(51) Int. Cl.
*B62D 7/00* (2006.01)
*B62D 7/18* (2006.01)
(Continued)

(52) U.S. Cl.
CPC .. *B62D 7/00* (2013.01); *B62D 7/18* (2013.01); *B62D 7/142* (2013.01); *B62D 1/163* (2013.01); *B62D 3/02* (2013.01); *B62D 7/08* (2013.01)

(58) Field of Classification Search
CPC ............. B62D 7/08; B62D 7/16; B62D 7/18; B62D 7/14; B62D 1/1632
USPC ................. 280/98, 99, 93.512; 180/9.64, 408
See application file for complete search history.

(56) References Cited

U.S. PATENT DOCUMENTS

| | | | | | |
|---|---|---|---|---|---|
| 239,432 | A | * | 3/1881 | Bollee | 180/303 |
| 2,423,266 | A | * | 7/1947 | Stokes | 180/262 |

(Continued)

FOREIGN PATENT DOCUMENTS

| | | | | | |
|---|---|---|---|---|---|
| JP | 62120231 | A | * | 6/1987 | B60K 17/30 |
| JP | 03070682 | A | * | 3/1991 | B62D 7/14 |
| WO | 2013137877 | A1 | | 9/2013 | |

OTHER PUBLICATIONS

International Preliminary Report on Patentability of PCT/US2011/061793 issued on May 27, 2014.
(Continued)

*Primary Examiner* — Nicole Verley
(74) *Attorney, Agent, or Firm* — Nelson Mullins Riley & Scarborough LLP

(57) ABSTRACT

A riding yard maintenance vehicle may include a frame, a steering assembly, a cable and at least one set of guide pulleys. Wheels of the riding yard maintenance vehicle may be attachable to the frame. The steering assembly may include a steering apparatus operably coupled to front wheels of the riding yard maintenance vehicle via a cable system. The cable system may include the cable, which may be wrapped around at least a portion of the steering shaft. The cable may terminate at respective ends thereof at corresponding ones of a first shaped cam and a second shaped cam each of which is operably coupled to respective ones of a first axle rod and a second axle rod. The first and second axle rods may be rotatably connected to respective ones of the front wheels. The first and second shaped cams may cause movement of the front wheels based on movement of the cable responsive to rotation of the steering shaft. The at least one set of guide pulleys may receive respective different portions of the cable to guide the cable to respective ones of the first and second shaped cams.

20 Claims, 8 Drawing Sheets

(51) Int. Cl.
*B62D 1/16* (2006.01)
*B62D 3/02* (2006.01)
*B62D 7/08* (2006.01)
*B62D 7/14* (2006.01)

(56) References Cited

U.S. PATENT DOCUMENTS

| | | | | |
|---|---|---|---|---|
| 2,676,029 | A * | 4/1954 | Hutchinson | 280/99 |
| 2,834,605 | A * | 5/1958 | McCollough | 180/410 |
| 2,842,376 | A * | 7/1958 | Krilanovich | 180/410 |
| 3,077,354 | A * | 2/1963 | Rateau | 280/99 |
| 3,669,466 | A * | 6/1972 | Spence | 180/409 |
| 4,504,074 | A * | 3/1985 | Smith | 280/93.513 |
| 4,787,646 | A * | 11/1988 | Kamlukin et al. | 280/124.113 |
| 4,852,679 | A * | 8/1989 | Fry | 180/234 |
| 4,934,726 | A * | 6/1990 | Daenens et al. | 280/408 |
| 4,950,126 | A * | 8/1990 | Fabiano et al. | 414/590 |
| 4,957,183 | A * | 9/1990 | Mullett et al. | 180/234 |
| 5,033,763 | A * | 7/1991 | Daenens et al. | 280/426 |
| 5,090,512 | A * | 2/1992 | Mullet et al. | 180/236 |
| 5,311,957 | A * | 5/1994 | McLaurin et al. | 180/253 |
| 5,529,135 | A | 6/1996 | Wenzel et al. | |
| 5,873,592 | A * | 2/1999 | Daenens | 280/410 |
| 5,996,723 | A * | 12/1999 | Shimizu et al. | 180/444 |
| 6,109,626 | A * | 8/2000 | Chapman | 280/47.11 |
| 6,125,963 | A * | 10/2000 | Staiger | 180/411 |
| 6,185,920 | B1 * | 2/2001 | Oxley | 56/14.7 |
| 6,874,305 | B2 * | 4/2005 | Ishimori | 56/10.8 |
| 7,073,822 | B1 * | 7/2006 | Renfroe et al. | 280/771 |
| 7,237,629 | B1 * | 7/2007 | Bland et al. | 180/6.24 |
| 7,665,748 | B2 * | 2/2010 | Okada | 280/99 |
| 7,686,107 | B1 | 3/2010 | Bland et al. | |
| 8,011,678 | B1 * | 9/2011 | Bell et al. | 280/98 |
| 8,459,672 | B1 * | 6/2013 | Pollard, Sr. | 280/98 |
| 8,544,246 | B2 * | 10/2013 | Jackson et al. | 56/6 |
| 8,882,119 | B2 * | 11/2014 | Burns, Jr. | 280/98 |
| 8,888,130 | B2 * | 11/2014 | Stark | 280/771 |
| 2003/0019682 | A1 * | 1/2003 | Schaedler et al. | 180/308 |
| 2004/0056444 | A1 * | 3/2004 | Bidwell | 280/99 |
| 2007/0284839 | A1 * | 12/2007 | Sasaoka | 280/93.502 |
| 2008/0277188 | A1 * | 11/2008 | Hauser et al. | 180/422 |

OTHER PUBLICATIONS

International Search Report and Written Opinion of PCT/US2011/061793 mailed on Mar. 26, 2012.
International Search Report and Written Opinion of PCT/US2012/029142 mailed on Jun. 14, 2012.

* cited by examiner

YARD MAINTENANCE VEHICLE WITH CABLE STEERING ASSEMBLY

TECHNICAL FIELD

Example embodiments generally relate to yard maintenance vehicles and, more particularly, relate to steering assembly for vehicles configured for performing lawn maintenance with rear wheel steering.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some zero turn mowers have employed separate steering levers or even a joystick to provide steering functionality. There are clearly a number of steering assembly options from which to choose when an operator considers purchasing a riding lawn mower based on performance criteria, budget restrictions, or personal preference. However, each different type of steering assembly has corresponding different technical challenges associated therewith.

In addition to preferences as to style and cost, some consumers may have a preference for machines that have a feel of providing quality in relation to various different specific features. One feature that can impact a consumer's opinion of quality may be the looseness of the steering assembly. In this regard, for example, a steering wheel that has a noticeable amount of "slack," "slop" or "play" in the coupling between the steering wheel and the wheels may feel inferior to another product that feels as though movement of the steering wheel is more tightly coupled to corresponding movements of the wheels.

BRIEF SUMMARY OF SOME EXAMPLES

Accordingly, in order to improve steering responsiveness, and in some cases also improve the feel of quality provided by a steering assembly, some example embodiments may provide a steering system that employs a steering cable that engages shaped cams disposed proximate to the respective ones of the wheels to which steering inputs are provided. The steering cable may provide a pull force to rotate one of the cams dependent upon the direction the steering apparatus is turned and a track bar may be used to translate corresponding movement to the other cam to take up any slack created in the steering cable. The cams and/or the track bar may be shaped and/or sized to provide for Ackermann geometry steering for the wheels of the yard maintenance vehicle.

In one example embodiment, a riding yard maintenance vehicle is provided. The riding yard maintenance vehicle may include a frame, a steering assembly, a cable and at least one set of guide pulleys. Wheels of the riding yard maintenance vehicle may be attachable to the frame. The steering assembly may include a steering apparatus operably coupled to front wheels of the riding yard maintenance vehicle via a cable system. The cable system may include the cable, which may be wrapped around at least a portion of the steering shaft. The cable may terminate at respective ends thereof at corresponding ones of a first shaped cam and a second shaped cam each of which is operably coupled to respective ones of a first axle rod and a second axle rod. The first and second axle rods may be rotatably connected to respective ones of the front wheels. The first and second shaped cams may cause movement of the front wheels based on movement of the cable responsive to rotation of the steering shaft. The at least one set of guide pulleys may receive respective different portions of the cable to guide the cable to respective ones of the first and second shaped cams.

In another example embodiment, a cable system is provided. The cable system may provide operable coupling between a steering apparatus of a riding yard maintenance vehicle and front wheels of the riding yard maintenance vehicle. The cable system may include a cable and at least one set of guide pulleys. The cable may be wrapped around a portion of a steering shaft operably coupled to the steering apparatus. The cable may terminate at respective ends thereof at corresponding ones of a first shaped cam and a second shaped cam each of which is operably coupled to respective ones of a first axle rod and a second axle rod. The first and second axle rods may be rotatably connected to respective ones of the front wheels. The first and second shaped cams may cause movement of the front wheels based on movement of the cable responsive to rotation of the steering shaft. The at least one set of guide pulleys may receive respective different portions of the cable to guide the cable to respective ones of the first and second shaped cams.

In another example embodiment, a method of providing cable controlled steering for a riding yard maintenance vehicle is provided. The method may include providing a steering assembly including a steering apparatus operably coupled to front wheels of the riding yard maintenance vehicle via a cable system and wrapping a cable around a portion of a steering shaft operably coupled to the steering apparatus. The cable may terminate at respective ends thereof at corresponding ones of a first shaped cam and a second shaped cam each of which is operably coupled to respective ones of a first axle rod and a second axle rod. The first and second axle rods may be rotatably connected to respective ones of the front wheels. The first and second shaped cams may cause movement of the front wheels based on movement of the cable responsive to rotation of the steering shaft. The method may further include providing at least one set of guide pulleys to receive respective different portions of the cable to guide the cable to respective ones of the first and second shaped cams.

Some example embodiments may improve responsiveness of a riding yard maintenance vehicle and also improve a consumer's satisfaction with the steering characteristics of such vehicles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
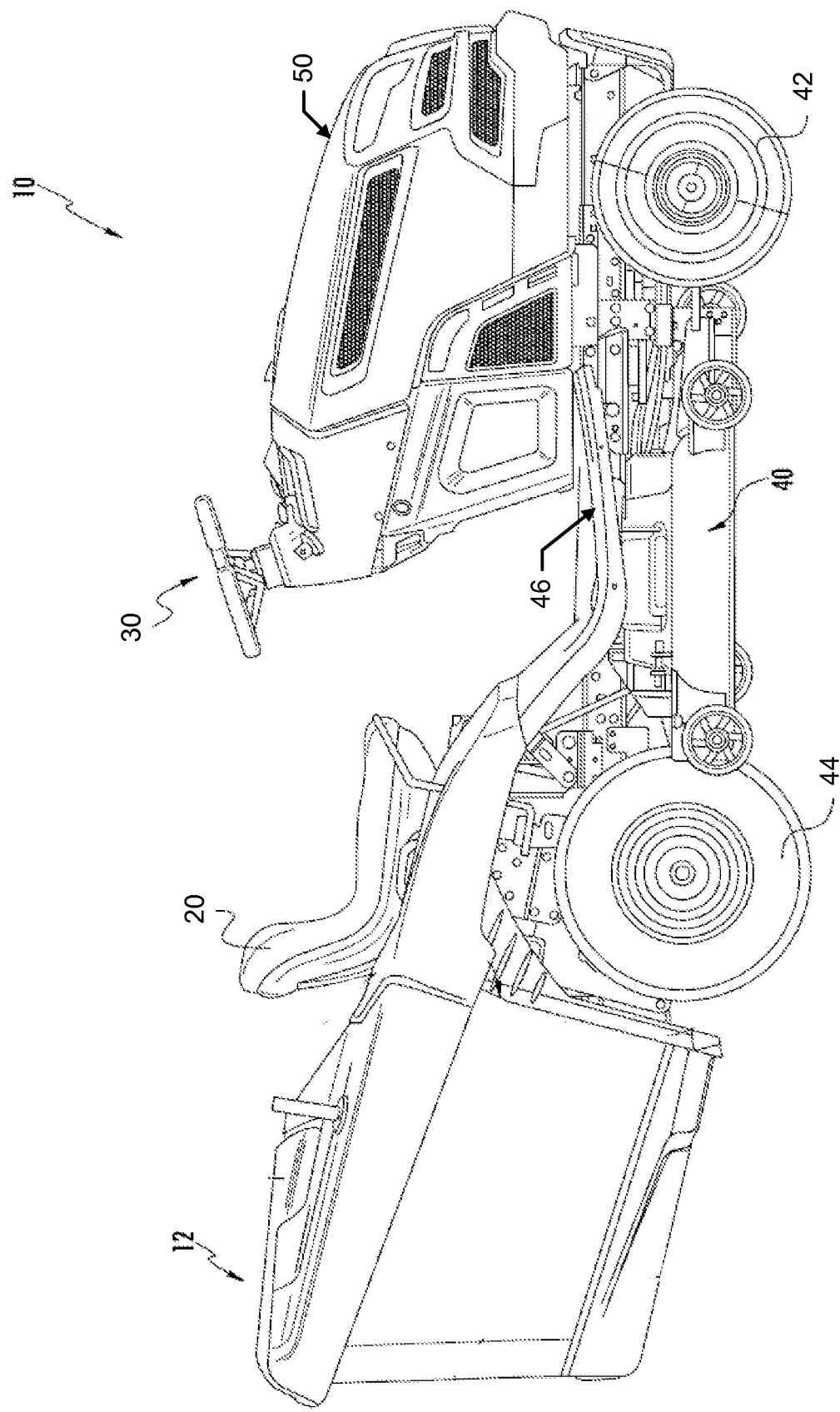
FIG. 1 illustrates a side view of a riding yard maintenance vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve steering responsiveness, and may substantially reduce or even eliminate the existence of any slack, slop or play experienced when operating the steering wheel of yard maintenance vehicles such as, for example, riding lawn mowers. In this regard, for example, some embodiments may employ a cable system to support steering functionality, but may utilize the cable system in connection with shaped cams and a track bar that are configured to provide Ackermann geometry steering. Ackermann geometry steering addresses the problem of inside and outside wheels tracing out circles of different radii when conducting a turn. Without Ackermann geometry steering, at least one of the wheels would need to slip sideways during the turn. To accomplish Ackermann geometry steering, many different methods may be employed. Many such methods attempt to use some sort of arrangement of linkages to cause both the inside and outside front wheels of a four wheeled vehicle to share the same center point for the radii of the circle each of the front wheels traces during a turn. Furthermore, this shared center point is typically at some point extended from a line through the rear axle. Thus, the inside front wheel is turned through a greater angle than the outside front wheel during the turn.

Some example embodiments may provide linkages to support Ackermann geometry steering in connection with a cable steering system. The cable steering system may include a cable that is affixed to a steering shaft at a fixed point and then wound around the steering shaft on either side of the fixed point to provide excess cable to be let out responsive to a turn. Some additional cable may also be wrapped around the steering shaft responsive to the turn and the additional cable may be pulled away from one of the wheels to turn a shaped cam proximate to the corresponding wheel. The cable may be affixed proximate to the shaped cam in order to cause the shaped cam and the spindle to which it is coupled to turn. The corresponding wheel may also turn. The turning of the shaped cam may also be translated to the shaped cam on the other front wheel using a track bar designed for Ackermann geometry steering. For example, the track bar may have a length that is less than the distance between the front wheels and configured to cause the inside front wheel for any particular turn inserted to be deflected by a greater angle than the corresponding outside front wheel. Some example embodiments may provide relatively tight coupling between the steering wheel and the front wheels when steering inputs are inserted. Thus, there is no or little noticeable slack when the steering wheel is turned before a corresponding turning of the front wheels is experienced. This may, again, give consumers the general feel of a quality and robust construction.

FIG. 1 illustrates a side view of a riding yard maintenance vehicle 10 having a bagging attachment 12. However, it should be appreciated that example embodiments may be employed on numerous other riding yard maintenance vehicles that may not include a bagging attachment 12. As shown and described herein, the riding yard maintenance vehicle 10 may be a riding lawn mower (e.g., a lawn tractor, front-mount riding lawn mower, zero-turn riding lawn mower, and/or the like). However, other example embodiments may be employed on riding yard maintenance vehicles that are configured or otherwise equipped to handle snow removal, brush cutting, tilling or other yard maintenance-related activities.

In some embodiments, the riding yard maintenance vehicle 10 may include a seat 20 that may be disposed at a center, rear or front portion of the riding yard maintenance vehicle 10. The riding yard maintenance vehicle 10 may also include a steering assembly 30 (e.g., including a steering wheel, handle bars, or other steering apparatus) functionally connected wheels of the riding yard maintenance vehicle 10 to which steering inputs are provided (e.g., the front and/or rear wheels in various different embodiments) to allow the operator to steer the riding yard maintenance vehicle 10. The operator may sit on the seat 20, which may be disposed to the rear of the steering assembly 30 to provide input for steering of the riding yard maintenance vehicle 10 via the steering assembly 30.

The riding yard maintenance vehicle 10 may also include, or be configured to support attachment of, a cutting deck 40 having at least one cutting blade mounted therein. As indicated above, in some cases, a height of the at least one cutting blade may be adjustable by an operator of the riding yard maintenance vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. When operating to cut grass, the grass clippings may be captured by a collection system (e.g., bagging attachment 12), mulched, or expelled from the cutting deck 40 via either a side discharge or a rear discharge.

The riding yard maintenance vehicle 10 may also include additional control related components such as one or more speed controllers, cutting height adjusters and/or the like. Some of the controllers, such as the speed controllers, may be provided in the form of foot pedals that may sit proximate to a footrest 46 (which may include a portion on both sides of the riding yard maintenance vehicle 10) to enable the operator to rest his or her feet thereon while seated in the seat 20. However, such controllers may also or alternatively be provided in the form of hand operated levers, buttons, or other operable devices.

In the pictured example embodiment of FIG. 1, an engine 50 of the riding yard maintenance vehicle 10 is disposed substantially forward of a seated operator. However, in other example embodiments, the engine 50 could be in different positions such as below or behind the operator. In some embodiments, the engine 50 may be operably coupled to one or more of the wheels of the riding yard maintenance vehicle 10 in order to provide drive power for the riding yard maintenance vehicle 10. In some embodiments, the engine 50 may be capable of powering one or two wheels, while in others, the engine 50 may power all four wheels of the riding yard maintenance vehicle 10. Moreover, in some cases, the engine 50 may manually or automatically shift between powering either two wheels or all four wheels of the riding yard maintenance vehicle 10.

Figure 2:
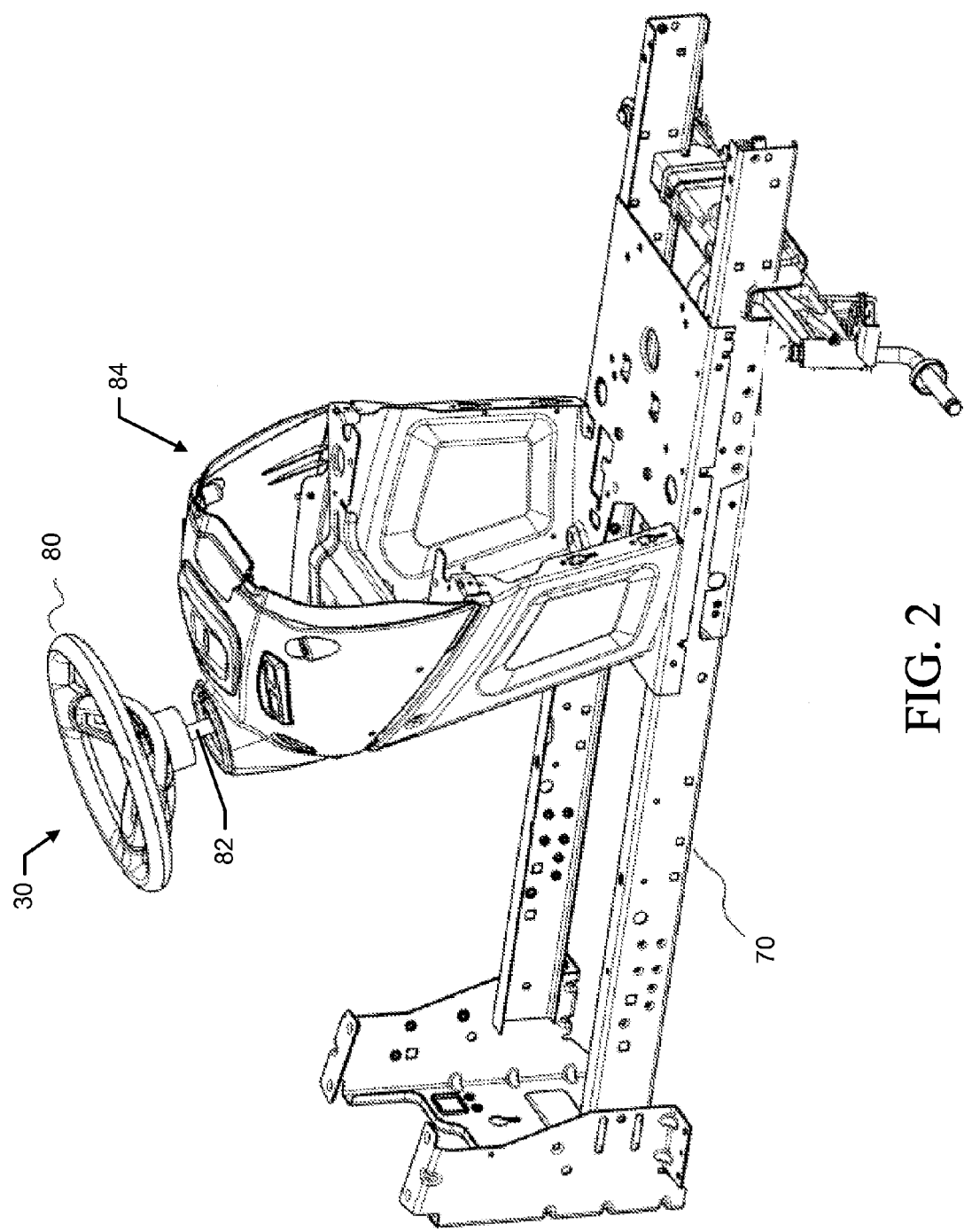
FIG. 2 illustrates a perspective view of a frame of the riding yard maintenance vehicle including some portions of the steering assembly according to an example embodiment.
Figure 3:
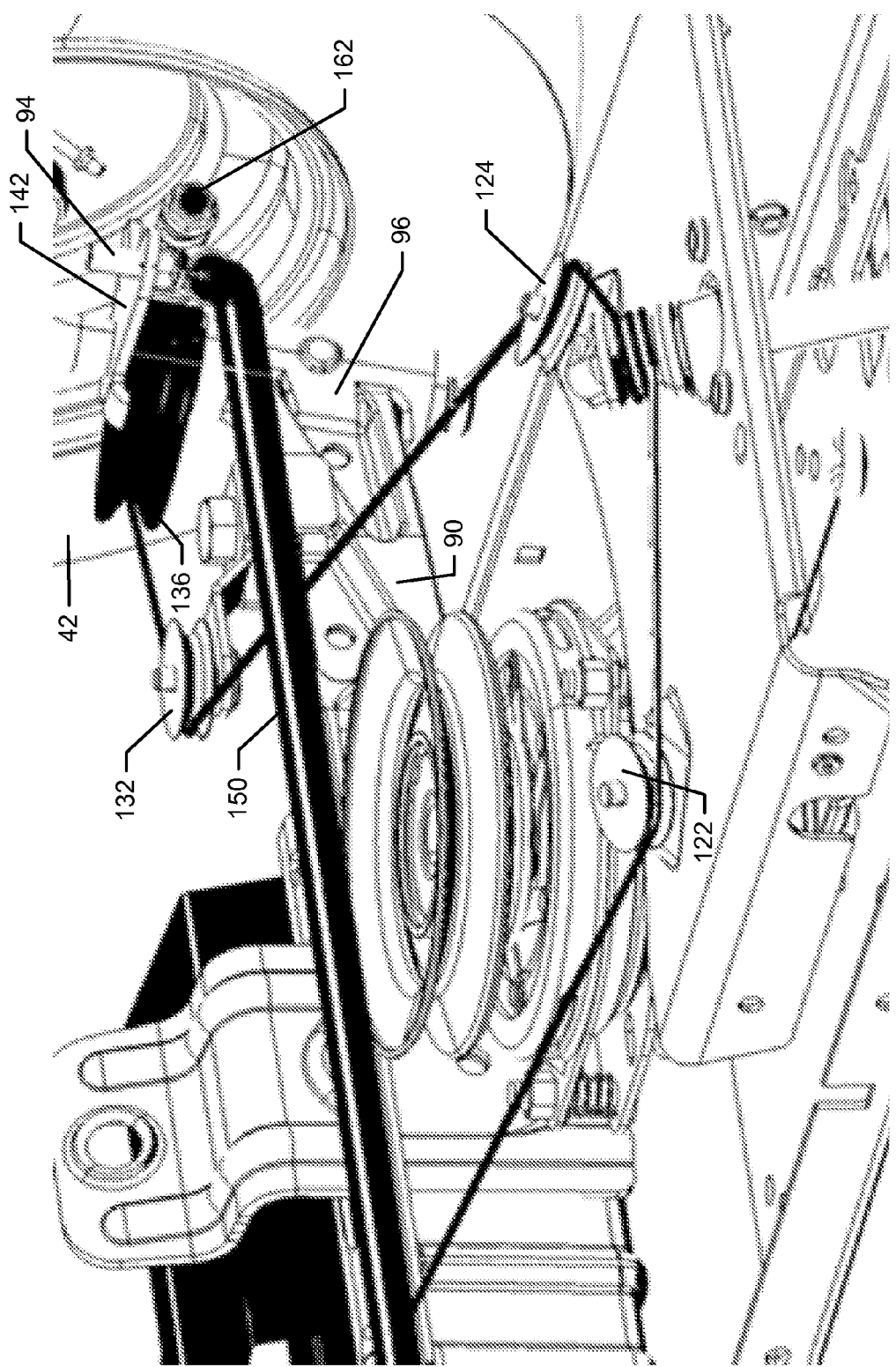
FIG. 3 illustrates a perspective view of an underside of a forward portion of the riding yard maintenance vehicle according to an example embodiment.
Figure 4:
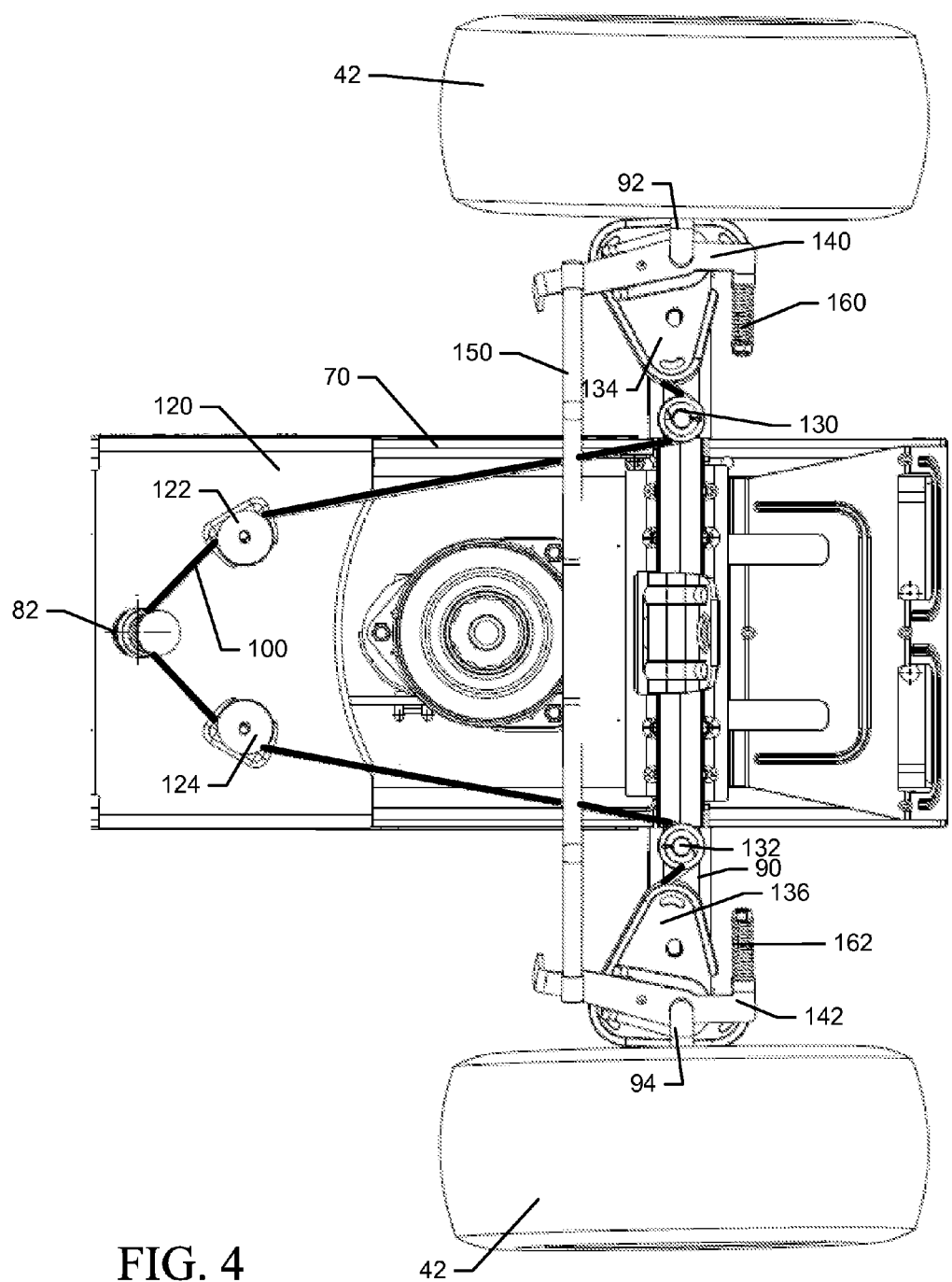
FIG. 4 illustrates a bottom view of the forward portion of the riding yard maintenance vehicle in FIG. 3 according to an example embodiment.
Figure 5:
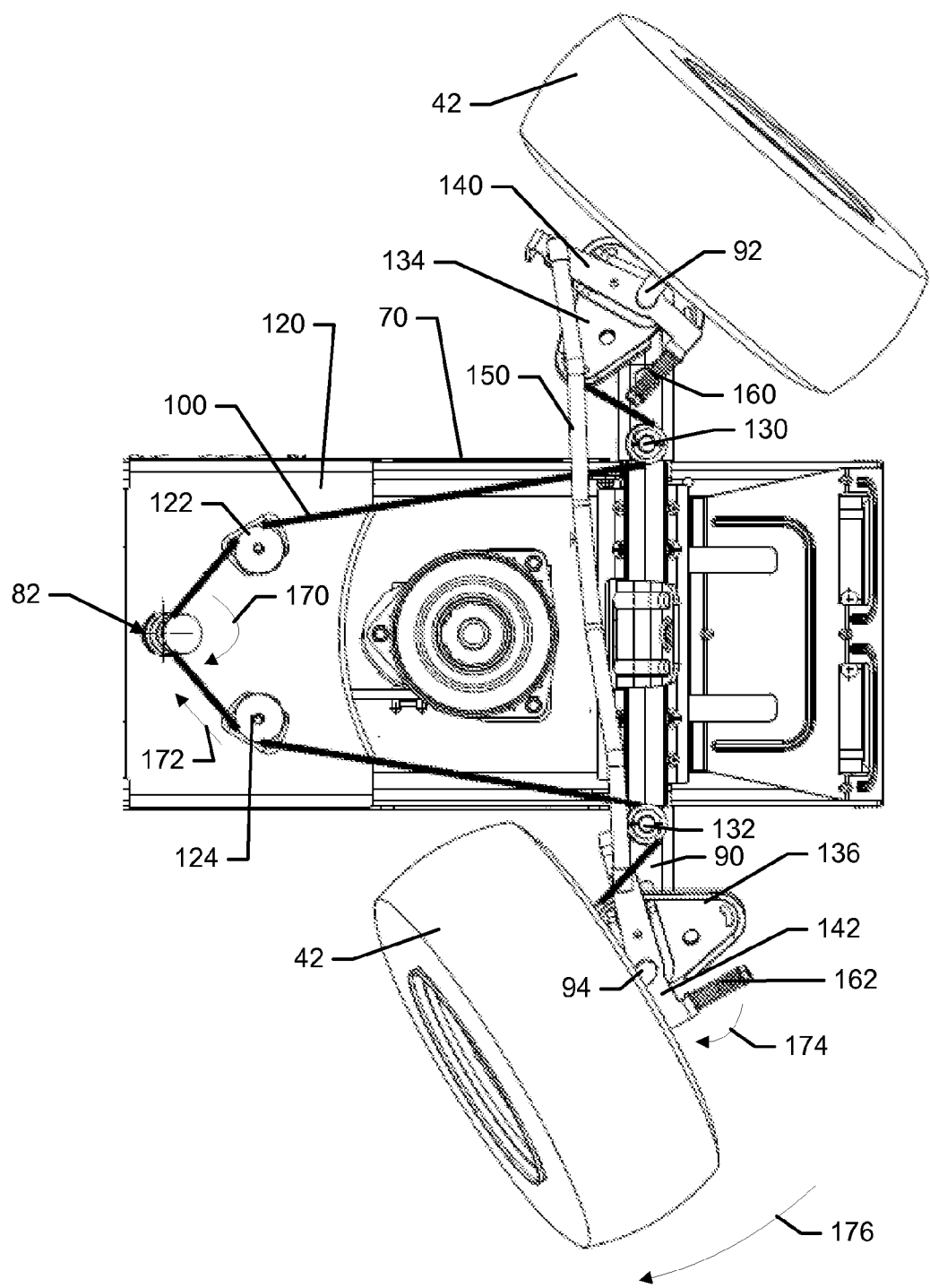
FIG. 5 illustrates a bottom view of the forward portion of the riding yard maintenance vehicle with a steering input inserted according to an example embodiment.
Figure 6:
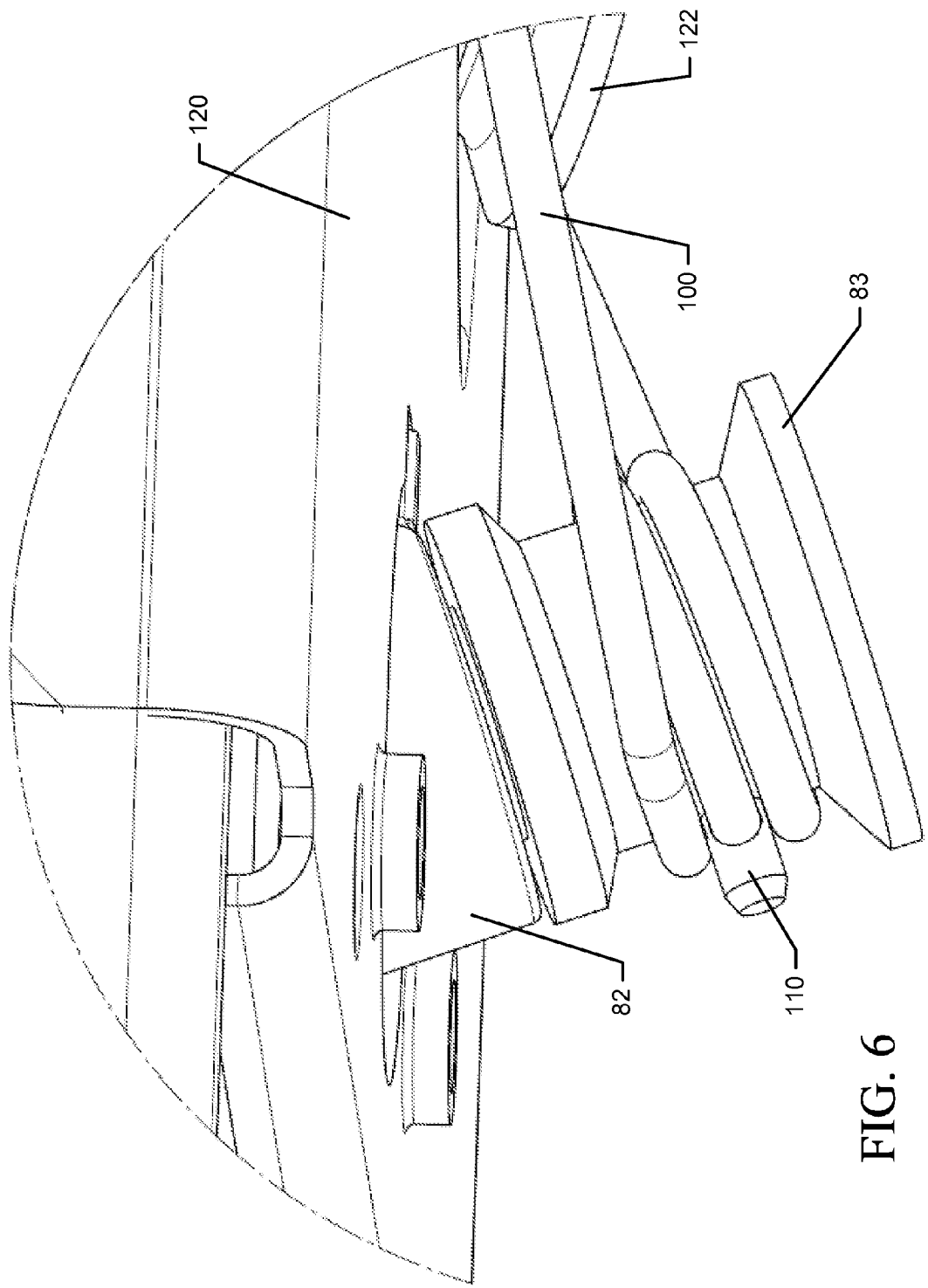
FIG. 6 illustrates a perspective view of cable wrapped around and affixed to the steering shaft according to an example embodiment.
Figure 7:
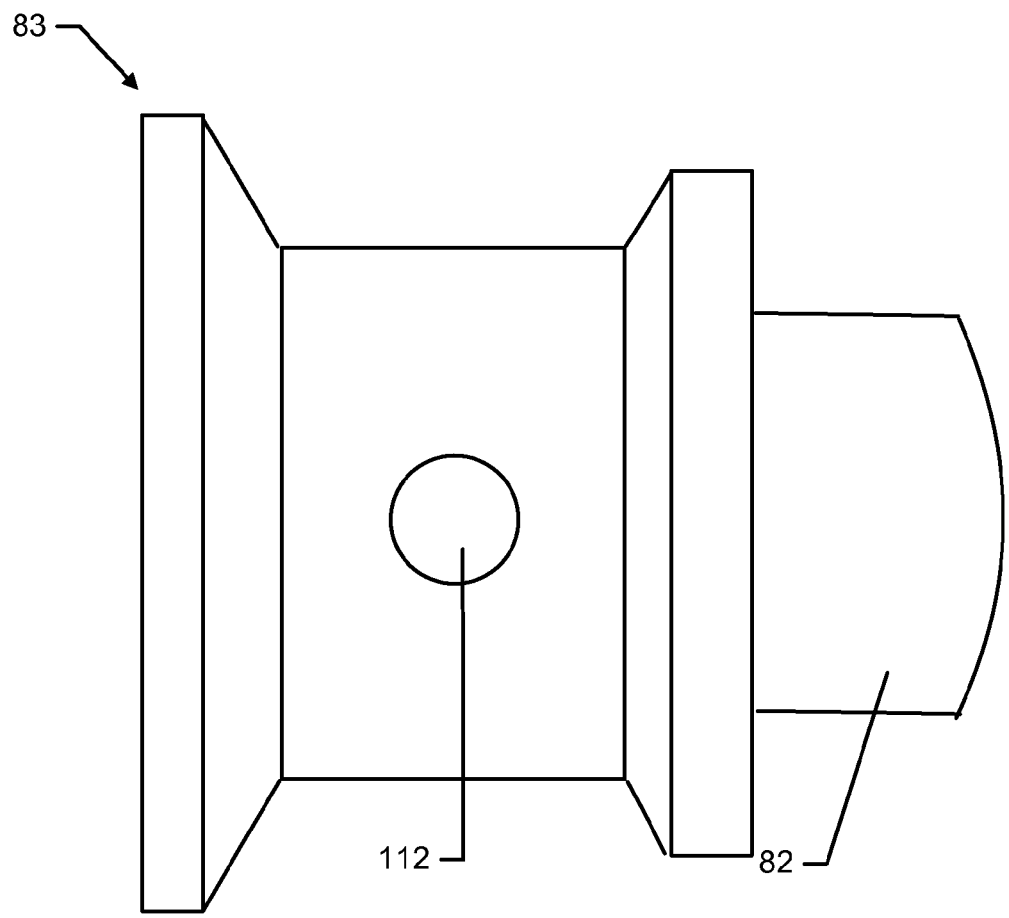
FIG. 7 illustrates a plan view of a retention feature disposed in a steering shaft according to an example embodiment.
Figure 8:
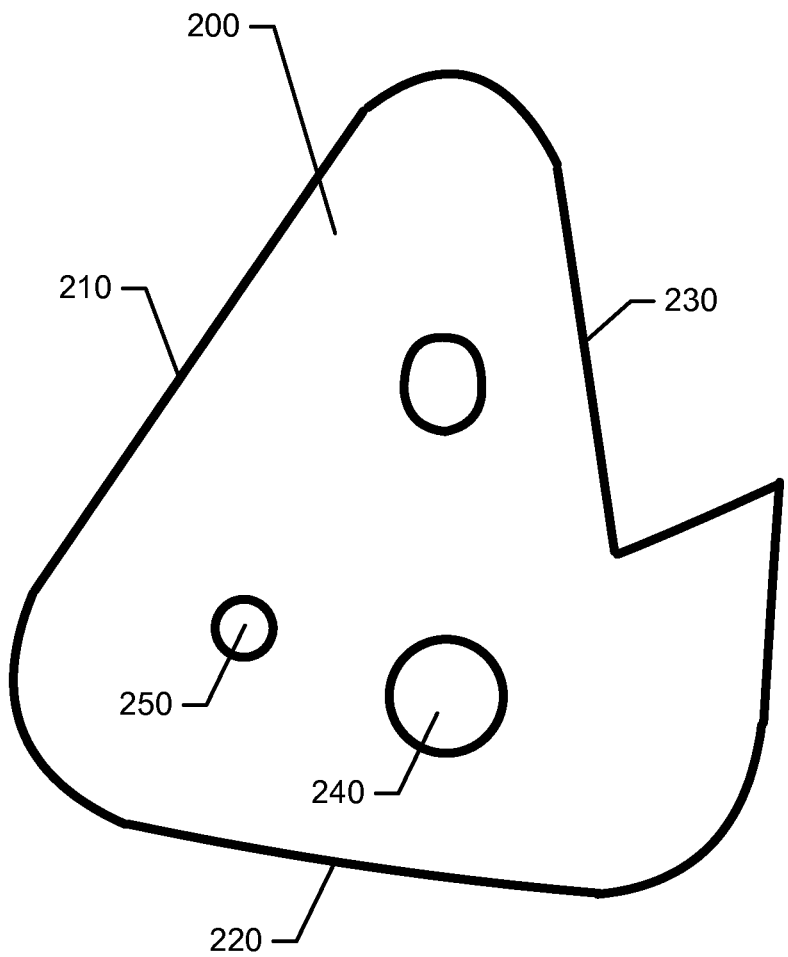
FIG. 8 illustrates a plan view of a shaped cam according to an example embodiment.

Portions of the steering assembly 30 of the riding yard maintenance vehicle 10 will now be described in greater detail in reference to FIGS. 2-8. In this regard, FIG. 2 illustrates a perspective view of a frame of the riding yard maintenance vehicle including some portions of the steering assembly according to an example embodiment. FIG. 3 illustrates a perspective view of the underside of a forward portion of the riding yard maintenance vehicle 10 according to an example embodiment. FIG. 4 illustrates a bottom view of the forward portion of the riding yard maintenance vehicle 10 in FIG. 3 according to an example embodiment. FIG. 5 illustrates a bottom view of the forward portion of the riding yard maintenance vehicle 10 with a steering input inserted according to an example embodiment. FIG. 6 illustrates a perspective view of cable wrapped around and affixed to the steering shaft according to an example embodiment. FIG. 7 illustrates a plan view of a retention feature disposed in a steering shaft according to an example embodiment. FIG. 8 illustrates a plan view of a shaped cam according to an example embodiment.

As shown in FIG. 2, the engine 50, the steering assembly 30, the cutting deck 40, the seat 20 and other components of the riding yard maintenance vehicle 10 may be operably connected (directly or indirectly) to a frame 70 of the riding yard maintenance vehicle 10. The frame 70 may be a rigid structure configured to provide support, connectivity and interoperability functions for various ones of the components of the riding yard maintenance vehicle 10.

In an example embodiment, the steering assembly 30 may include a steering wheel 80 and a steering shaft 82 (or column). The steering shaft 82 may operably connect to the steering wheel 80 and additional steering assembly components that translate inputs in the form of motion of the steering wheel 80 into steering controls to the wheels to which steering inputs are provided (e.g., the front wheels in this example). Moreover, in some embodiments, the steering shaft 82 may extend into a steering console 84, which may provide a cover to improve the aesthetic appearance of the riding yard maintenance vehicle 10 by obscuring the view of various mechanical components associated with the steering assembly 30.

In some example embodiments, the steering assembly 30 may be embodied as an assembly of metallic or other rigid components that may be welded, fitted, bolted or otherwise operably coupled to each other and coupled to the wheels of the riding yard maintenance vehicle 10 to which steering inputs are provided (e.g., front wheels 42). For example, the steering assembly 30 may include or otherwise be coupled with a steering cable assembly to translate rotational motion applied to the steering assembly 30 (and more particularly to the steering wheel 80) into directional inputs to orient the wheels to which steering inputs are provided (e.g., front wheels 42 in this example) accordingly.

FIG. 3 illustrates a perspective view of portions of the steering assembly 30 as they relate to coupling the steering wheel 80 to the front wheels 42. FIG. 4 illustrates a bottom view of the forward portion of the riding yard maintenance vehicle 10 according to an example embodiment. As shown in FIGS. 3 to 5, the frame 70 may support some of the components associated with the steering cable assembly. In this regard, for example, the frame 70 may support one or more brackets, plates, or other structural members to which pulleys, cams or other structures of the steering cable assembly may be coupled. For example, the frame 70 may support an axle mount 90, which may lie substantially perpendicular to a longitudinal centerline of the frame 70 (and the riding yard maintenance vehicle 10) and extend between the front wheels 42 to provide support for mounting of the front wheels 42.

Each of the front wheels 42 may be affixed or otherwise operably coupled to corresponding ones of a first axle rod 92 and a second axle rod 94. The first and second axle rods 92 and 94 may be rotatably mounted to opposite ends of the axle mount 90. In some examples, the axle mount 90 may be structured as a single assembly, weldment, rod, tube or other support structure having a first distal end that rotatably engages the first axle rod 92 and a second distal end that rotatably engages the second axle rod 94. In some embodiments, the first and second distal ends of the axle mount 90 may terminate in respective first and second sleeves. For the sake of simplicity, FIG. 3 only illustrates one of the first and second sleeves, namely the first sleeve 96. The first and second sleeves may receive the first and second axle rods 92 and 94, respectively, therein. In some embodiments, the first and second sleeves may further include bearings (e.g., a bushing, ball bearing or journal bearing) to facilitate rotational relative motion between the first and second sleeves and the first and second axle rods 92 and 94, respectively. Thus, the rotatable engagement between the axle mount 90 and the first and second axle rods 92 and 94 may be provided by the first and second sleeves, respectively.

The first and second axle rods 92 and 94 may be constructed to have at least two linear portions that are connected to each other by a bent portion. The two linear portions may include a spindle or top portion that is inserted into one of the sleeves (e.g., the second sleeve 96 or the first sleeve) for rotatable connection therewith, and an axle or bottom portion to which one of the front wheels 42 is rotatably attached. In an example embodiment, the bent portion may be formed such that the top portion may form a 90 degree or an obtuse angle with respect to the bottom portion. The rotatable engagement between the axle mount 90 and the first and second axle rods 92 and 94 may enable the steering cable assembly to operate to cause rotation of the first and second axle rods 92 and 94 within their respective sleeves responsive to steering inputs provided at the steering wheel 80.

In an example embodiment, the steering cable assembly may include a cable 100. Although the cable 100 may be a wire or metallic fiber based member, it should be appreciated that the cable 100 could alternatively be embodied as any flexible elongate member that may be used to translate forces between components attached thereto responsive to movement of one portion thereof. Thus, for example, the cable 100 may be made of metallic, natural or synthetic fibers, or may be a substantially unitary piece of synthetic material or a collection of fitted metallic, natural or synthetic materials. As such, in some embodiments, the cable 100 could be embodied as a belt or chain. In one example embodiment, the cable 100 may be embodied as a 5/32 inch, 7×19, stainless steel aircraft cable. However, other cables could alternatively be used in varying sizes and construction to provide desired wear resistance and performance characteristics.

The cable 100 may be fixedly attached to the steering shaft 82 as shown in greater detail in FIGS. 6 and 7. In an example embodiment, the steering shaft 82 may include a wheel head 83 that may be similar to a pulley wheel except that the wheel head 83 may be fixed to the end or another portion of the steering shaft 82. The cable 100 may be wrapped around the steering shaft 82 within the wheel head 83. Although the example in FIGS. 2-8 does not employ gears, it should be appreciated that any desirable turn ratio for the steering wheel 80 and the wheel head 83 may be provided using gears or linkages configured to provide such a turn ratio. In some embodiments, a relatively smaller sized wheel head 83 may provide increased mechanical advantage relative to exerting forces via the cable 100 to affect steering responsive to operator inputs at the steering wheel 80. In the example of FIGS. 6 and 7, the wheel head 83 may be a one inch diameter drum on which the cable 100 wraps. However, larger or smaller diameter drums may be used in other examples and with other sized cables.

In some embodiments, such as the example of FIG. 6, the cable 100 may include a bead, detent or other protrusion 110 that may be crimped, welded or otherwise affixed to or included in the cable 100. The protrusion 110 may then fit within a retention feature 112 that may be affixed to, or integrally formed in, a portion of the steering shaft 82. The retention feature 112 may be a metal bracket, clamp or other device that is welded, bolted, or otherwise fixedly attached to the steering shaft 82 to provide a rigid attachment point for the protrusion 110 to engage. However, in an example embodiment such as that which is illustrated in FIG. 7, the retention feature 112 may simply be a receiving orifice formed in the wheel head 83 to receive the protrusion 110. The receiving orifice, if employed, may be shaped to correspond to a shape of the protrusion 110. Thus, for example, the protrusion 110 may fit within the retention feature 112 and cause the corresponding portion of the cable 100 to be fixed to the steering shaft 82 at the retention feature 112. In some embodiments, the retention feature 112 may include a tightening screw or other releasable clamping device to assist or otherwise provide for affixing the cable 100 to the retention feature 112. The combination of the retention feature 112 and the protrusion 110 may prevent the cable 100 from sliding when the steering shaft 82 is rotated, and may therefore provide a snug or tight feel to the steering assembly 30.

As shown in FIGS. 3 and 6, the cable 100 may be wrapped around the steering shaft 82 (e.g., at the wheel head 83, if included) at least one full turn on each opposing side of the retention feature 112 to provide excess cable to account for rotation of the steering wheel 80. The engagement of the retention feature 112 to the protrusion 110 may ensure that the cable 100 does not slip or slide on the steering shaft 82 when the steering shaft 82 is rotated (e.g., responsive to movement of the steering wheel 80). Furthermore, the at least one full turn of excess cable on each side of the retention feature 112 may provide for sufficient cable to be let out toward one of the front wheels 42 responsive to turning of the steering wheel 80 without letting out all excess cable and reaching the point where the portion of the cable 100 that is affixed to the steering shaft 82. Thus, sufficient excess cable may be provided to ensure that for even the maximum possible magnitude of turn that can be inserted on the steering wheel 80 and/or realized at the front wheels 42, cable can be let out toward one of the front wheels 42 without reaching a hard stop at the point where the portion of the cable 100 is affixed to the steering shaft 82. As a steering input is provided to the steering wheel 80 and translated to the steering shaft 82 to cause rotation of the steering shaft 82, excess cable may be let out in one direction while additional cable is wound up onto the steering shaft 82 from the other direction.

As shown in FIGS. 3 to 5, the steering shaft 82 may extend through a portion of the frame 70 and through a support plate 120. In some cases, the steering shaft 82 may be at an angle of other than 90 degrees relative to a plane of the support plate 120. The support plate 120 of some example embodiments may be disposed rearward of the front wheels 42 on the underside of the frame 70. Moreover, the steering shaft 82 may extend through the support plate 120 at a location that is substantially along the longitudinal centerline of the riding yard maintenance vehicle 10. In some embodiments, the support plate 120 may also support a first set of guide pulleys (e.g., first pulley 122 and second pulley 124). The first and second pulleys 122 and 124 may be disposed forward and outboard of the steering shaft 82. In other words, the first and second pulleys 122 and 124 may be positioned closer to the front wheels 42 than the steering shaft 82 while one of the pulleys of the first set of guide pulleys (e.g., the first pulley 122) may be disposed to be displaced from the longitudinal centerline by a predetermined distance and the other one of the pulleys of the first set of guide pulleys (e.g., the second pulley 124) may be disposed to be displaced from the longitudinal centerline by the predetermined distance on the opposite side of the longitudinal centerline. Thus, the first and second pulleys 122 and 124 may mirror each other relative to the longitudinal centerline of the riding yard maintenance vehicle 10 as shown in FIG. 4. In an example embodiment, as shown in FIG. 3, the first and second pulleys 122 and 124 may also each be disposed to lie in a plane that is at an angle relative to the plane in which the support plate 120 lies. In this regard, for example, the first and second pulleys 122 and 124 may each be canted outward at substantially equal cant angles.

The cable 100 may extend from the steering shaft 82 in two different directions to each respective one of the first and second pulleys 122 and 124. A respective different portion of the cable 100 may then further extend from each respective one of the first and second pulleys 122 and 124 to respective pulleys of a second set of guide pulleys. The second set of guide pulleys may include a third pulley 130 and a fourth pulley 132. The third and fourth pulleys 130 and 132 may each be disposed on the axle mount 90 to mirror each other relative to the longitudinal centerline of the frame 70. In some embodiments, the third and fourth pulleys 130 and 132 may be directly mounted to the axle mount 90. However, as an alternative, and as shown in FIG. 3, the third and fourth pulleys 130 and 132 may be mounted to a bracket that is mounted to the axle mount 90. In an example embodiment, the third and fourth pulleys 130 and 132 may be disposed to lie in a plane that is substantially parallel to the plane in which the support plate 120 lies.

The third and fourth pulleys 130 and 132 may be used to direct opposite ends of the cable 100 outward toward each of the front wheels 42 to engage shaped cams disposed proximate to each respective one of the front wheels 42. The shaped cams may include a first shaped cam 134 and a second shaped cam 136. The first and second shaped cams 134 and 136 may be affixed to a first steering knuckle 140 and a second steering knuckle 142, respectively. Furthermore, the first and second steering knuckles 140 and 142 may be affixed to respective ones of the first and second axle rods 92 and 94. In some embodiments, the first and second shaped cams 134 and 136 may each be substantially triangular plate shaped cams having a relatively shorter base portion and two longer leg portions that meet each other to form a rounded apex at a position that is spaced a relatively short distance from the respective pulleys of the second set of guide pulleys. The two longer leg portions may include an engaged longer leg, and a disengaged longer leg, with engagement being referenced to contact with the cable 100. The engaged longer leg may be the rearward facing longer leg since the cable 100 is wrapped around the rearward facing portion of the first and second shaped cams 134. The disengaged longer leg may be the forward facing longer leg.

FIG. 8 illustrates a plan view of a body of one of the first and second shaped cams 134 and 136. As shown in FIG. 8, a cam body 200 may be provided with an engaged longer leg 210 and a base 220. In this example, the disengaged longer leg 230 may be broken into two portion to accommodate provision of the end of the cable 100 to a tensioning device disposed at an end portion of a corresponding steering knuckle. The cam body 200 may also include a spindle receiver 240 for receiving a spindle of its corresponding axle rod. In some cases, the cam body 200 may further include a holding orifice 250 through which a portion of the steering knuckle may pass to hold the steering knuckle's position relative to the cam body 200 as the steering knuckle and shaped cam rotate together. In an example embodiment, dimensions for the cam body 200 can be calculated using the radii and the position of the radii center points such that the outer edges are 2.75" from the center of rotation when a corresponding wheel is being pulled by the cable 100 to where it is the inner wheel during the turn, and 3.94" when it is the outer wheel, making the cable pull equal due to the inverse relationship of the cam lobes and angle of the spindle during the turn.

In an example embodiment, the steering knuckles (e.g., the first and second steering knuckles 140 and 142) may be Pitman arms to which a track rod 150 may be mounted. The track rod 150 may extend between the first and second steering knuckles 140 and 142 to link the first and second steering knuckles 140 and 142 together mechanically. The Pitman arms (e.g., the first and second steering knuckles 140 and 142) may be angled inwardly as they extend toward a back of the riding yard maintenance vehicle 10 to a point where the track rod 150 is supported. Thus, the track rod 150 may be of a shorter length than the distance between the front wheels 42 and the angle provided to the first and second steering knuckles 140 and 142. The angle of the first and second steering knuckles 140 and 142 as they extend back to where the track rod 150 is supported may be selected to approximate Ackermann geometry steering. As such, for example, the angling of the first and second steering knuckles 140 and 142 may be such that, when a steering input is provided to one of the front wheels 42, the inside wheel relative to the turning direction is turned at a sharper angle than the outside wheel as shown in FIG. 5.

In an example embodiment, first and second steering knuckles 140 and 142 may be relatively mirror image reproductions of each other oriented to operate on opposite sides of the riding yard maintenance vehicle 10. Similarly, the first and second axle rods 92 and 94 may be relatively mirror image reproductions of each other oriented to operate on opposite sides of the riding yard maintenance vehicle 10. Accordingly, for purposes of explanation, the first steering knuckle 140 and the first axle rod 92 will be described in greater detail below, but it should be appreciated that the second steering knuckle 142 and the second axle rod 94 are structured and function similarly (albeit for an opposite side of the riding yard maintenance vehicle 10).

The first steering knuckle 140 may be affixed to the first axle rod 92 proximate to a bottom portion of the first sleeve. The first steering knuckle 140 may, in some cases, be a bracket formed from sheet metal or another rigid material and may extend around all sides of the first axle rod 92, but include angled extensions that extend in forward and aft directions from the first axle rod 92. As such, a substantial portion of the first steering knuckle 140 may lie in a single plane, which may be substantially perpendicular to the longitudinal length of the first sleeve. In some embodiments, the first steering knuckle 140 may be welded, bolted, or otherwise fixedly attached to its corresponding shaped cam (e.g., the first shaped cam 134). In an example embodiment, the first steering knuckle 140 may include one or more protrusions that may be shaped to extend into respective receiving orifices of the first shaped cam 134 to affix the first steering knuckle 140 to the first shaped cam 134. The cable 100 may then be wrapped from a corresponding one of the second set of pulleys (e.g., the third pulley 130) to each respective shaped cam (e.g., the first shaped cam 134). In an example embodiment, the cable 100 may wrap around a portion of the first shaped cam 134 and terminate at a first tension adjuster 160 disposed at a forward end of the first steering knuckle 140. The opposite end of the cable 100 may terminate at a second tension adjuster 162 disposed at a forward end of the second steering knuckle 142. The first and second tension adjusters 160 and 162 may be configured to prevent over compression of the cable 100 and may be tightenable using an adjustment screw to stretch the cable 100.

In an example embodiment, as shown in FIG. 4, the cable 100 may wrap around the steering shaft 82 and then pass over an outer side of the first set of guide pulleys. The cable 100 may then pass from the first set of guide pulleys to the second set of guide pulleys and extend around an inward and forward portion of the second set of guide pulleys to extend outward toward each of the front wheels 42. From the second set of guide pulleys, the cable 100 may wrap around a rear portion of the respective shaped cams to terminate at a forward portion of each respective steering knuckle or Pitman arm. The wrapping of the cable 100 around the rear portion of the respective shaped cams gives an increased mechanical advantage for turning of the front wheels 42 relative to the forces that would be provided if the cable 100 was wrapped around the front portion of the shaped cams. Accordingly, example embodiments provide a direct cable link from the steering shaft to each respective one of the front wheels 42 by providing engagement of the cable 100 to the shaped cams that are affixed to the spindle of each respective axle rod to which the front wheels 42 are rotatably coupled. Thus, as the cable 100 is pulled, the shaped cams are rotated, and the front wheels 42 are correspondingly rotated to a direction determined based on positioning of the steering wheel 80.

As an example, referring to FIG. 5, if the steering wheel 80 is turned to the left (e.g., counterclockwise) to cause a left turn (and corresponding leftward angling of the front wheels 42), the steering shaft 82 may be caused to rotate to the left or counterclockwise as well. However, since FIG. 5 views the steering shaft 82 from the bottom, the counterclockwise rotation of the steering shaft 82 appears to turn right or clockwise in FIG. 5. Arrow 170 illustrates the direction of motion of the steering shaft 82 according to this example. As the steering shaft 82 rotates responsive to turning of the steering wheel 80, cable 100 is pulled away from the left one of the front wheels 42 (the bottom wheel, pictured on the right of the frame 70 in FIG. 5 due to the fact that FIG. 5 presents a bottom view) as indicated by arrow 172. The pulling of the cable 100 away from the left front wheel causes cable to be wound up onto the steering shaft 82 and causes the second tension adjuster 162 to be pulled. As the second tension adjuster 162 is pulled, the second steering knuckle 142 is rotated as shown by arrow 174 causing rotation of the second shaped cam 136 and the release of cable to be wound up onto the steering shaft 82.

The rotation of the second steering knuckle 142 and the second shaped cam 136 causes corresponding rotation of the left front wheel to cause the wheel to turn as shown by arrow 176. The rotation of the second steering knuckle 142 also causes the track rod 150 to be pushed toward the right front wheel (on top and pictured on the left in this example due to the view being from the bottom). As can be seen from FIG. 5, the shape of the second shaped cam 136 (e.g., having the engaged longer leg of the second shaped cam 136 release cable responsive to rotation of the second shaped cam 136) causes a relatively sharper angle to be inserted with respect to turning the left front wheel than will be experienced at the right front wheel. In this regard, when the track rod 150 provides force to move the first steering knuckle 140, the first steering knuckle 140 will not be turned as sharply as the second steering knuckle 142 was turned. Furthermore, the shape of the first shaped cam 134 (e.g., having the engaged longer leg of the first shaped cam 134 turn to take up additional cable responsive to rotation of the first shaped cam 134) causes more cable to be accommodated with less turning of the first shaped cam 134. Accordingly, as shown in FIG. 5, the left front wheel (pictured on the right in this view) will turn more sharply than the right front wheel (pictured on the left in this example), and the additional cable provided responsive to sharper turning of the left front wheel can be accommodated by a smaller rotation of the long side of the first shaped cam 134.

In some embodiments, a method of providing cable controlled steering for a riding yard maintenance vehicle may be provided. In such embodiments, the method may include providing a steering assembly including a steering apparatus operably coupled to front wheels of the riding yard maintenance vehicle via a cable system and wrapping a cable around a portion of a steering shaft operably coupled to the steering apparatus. The cable may terminate at respective ends thereof at corresponding ones of a first shaped cam and a second shaped cam each of which is operably coupled to respective ones of a first axle rod and a second axle rod. The first and second axle rods may be rotatably connected to respective ones of the front wheels. The first and second shaped cams may cause movement of the front wheels based on movement of the cable responsive to rotation of the steering shaft. The method may further include providing at least one set of guide pulleys to receive respective different portions of the cable to guide the cable to respective ones of the first and second shaped cams.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding yard maintenance vehicle comprising:
a frame to which wheels of the riding yard maintenance vehicle are attachable;
a steering assembly comprising a steering apparatus, wherein the steering apparatus comprises a steering shaft operably coupled to front wheels of the riding yard maintenance vehicle via a cable system;
a cable forming a portion of the cable system, the cable being wrapped around at least a portion of the steering shaft, the cable terminating at respective ends thereof at corresponding ones of a first shaped cam and a second shaped cam each of which is operably coupled to respective ones of a first axle rod and a second axle rod, the first and second axle rods being rotatably connected to respective ones of the front wheels, the first and second shaped cams causing movement of the front wheels based on movement of the cable responsive to rotation of the steering shaft; and
at least one set of guide pulleys receiving respective different portions of the cable to guide the cable to respective ones of the first and second shaped cams.

2. The riding yard maintenance vehicle of claim 1, wherein the at least one set of guide pulleys comprises a first pulley and a second pulley, the first and second pulleys being disposed on opposing sides of a longitudinal centerline of the frame forward of the steering shaft.

3. The riding yard maintenance vehicle of claim 2, wherein the at least one set of guide pulleys comprises a third pulley and a fourth pulley, the third and fourth pulleys being disposed on an axle mount coupled to the frame at opposing sides of the longitudinal centerline of the frame to provide the cable to respective ones of the first and second shaped cams.

4. The riding yard maintenance vehicle of claim 1, wherein the first and second shaped cams are each substantially triangular shaped cams having a relatively shorter base portion and two longer leg portions, a rear most one of the two longer leg portions being configured to receive the cable from the at least one set of guide pulleys.

5. The riding yard maintenance vehicle of claim 1, wherein rotation of the steering shaft causes an amount of cable to be pulled away from the first shaped cam based on a magnitude of a steering input provided at the steering apparatus, and causes an equal amount of cable to be taken up by the second shaped cam, and wherein less rotational movement of the second shaped cam is required to take up the equal amount of cable compared to rotational movement of the first shaped cam to provide the amount of cable.

6. The riding yard maintenance vehicle of claim 1, wherein the first shaped cam is affixed to a first steering knuckle affixed to a spindle portion of the first axle rod and the second shaped cam is affixed to a second steering knuckle affixed to a spindle portion of the second axle rod.

7. The riding yard maintenance vehicle of claim 6, wherein a track rod is provided to extend between the first and second steering knuckles.

8. The riding yard maintenance vehicle of claim 7, wherein the first and second steering knuckles are each angled inwardly along respective lengths of the first and second steering knuckles as the first and second steering knuckles extend toward a rear of the riding yard maintenance vehicle.

9. The riding yard maintenance vehicle of claim 6, wherein angling of each of the first and second steering knuckles is provided to approximate Ackermann geometry steering.

10. The riding yard maintenance vehicle of claim 6, wherein opposite ends of the cable are affixed to respective ones of the first and second steering knuckles.

11. The riding yard maintenance vehicle of claim 10, wherein the first and second steering knuckles comprise first and second tension adjusters, respectively, and wherein the first and second tension adjusters are configured to enable selective tightening of the cable.

12. The riding yard maintenance vehicle of claim 1, wherein the cable comprises a protrusion provided at a midpoint of the cable, and wherein the protrusion is affixed to a retention feature disposed on a portion of the steering shaft.

13. The riding yard maintenance vehicle of claim 12, wherein the protrusion comprises a bead crimped onto the cable, and wherein the retention feature comprises:
 a receiving orifice configured to receive the bead; or
 a bracket or clamp configured to receive the bead.

14. A cable system for providing operable coupling between a steering apparatus of a riding yard maintenance vehicle and front wheels of the riding yard maintenance vehicle, the cable system comprising:
 a cable wrapped around a portion of a steering shaft operably coupled to the steering apparatus, the cable terminating at respective ends thereof at corresponding ones of a first shaped cam and a second shaped cam each of which is operably coupled to respective ones of a first axle rod and a second axle rod, the first and second axle rods being rotatably connected to respective ones of the front wheels, the first and second shaped cams causing movement of the front wheels based on movement of the cable responsive to rotation of the steering shaft; and
 at least one set of guide pulleys receiving respective different portions of the cable to guide the cable to respective ones of the first and second shaped cams.

15. The cable system of claim 14, wherein the at least one set of guide pulleys comprises a first pulley and a second pulley, the first and second pulleys being disposed on opposing sides of a longitudinal centerline of a frame of the riding yard maintenance vehicle forward of the steering shaft.

16. The cable system of claim 15, wherein the at least one set of guide pulleys comprises a third pulley and a fourth pulley, the third and fourth pulleys being disposed on an axle mount coupled to the frame at opposing sides of the longitudinal centerline of the frame to provide the cable to respective ones of the first and second shaped cams.

17. The cable system of claim 14, wherein the first and second shaped cams are each substantially triangular shaped cams having a relatively shorter base portion and two longer leg portions, a rear most one of the two longer leg portions being configured to receive the cable from the at least one set of guide pulleys.

18. The cable system of claim 14, wherein rotation of the steering shaft causes an amount of cable to be pulled away from the first shaped cam based on a magnitude of a steering input provided at the steering apparatus, and causes an equal amount of cable to be taken up by the second shaped cam, and wherein less rotational movement of the second shaped cam is required to take up the equal amount of cable compared to rotational movement of the first shaped cam to provide the amount of cable.

19. A method of providing cable controlled steering for a riding yard maintenance vehicle, the method comprising:
 providing a steering assembly comprising a steering apparatus operably coupled to front wheels of the riding yard maintenance vehicle via a cable system;
 wrapping a cable around a portion of a steering shaft operably coupled to the steering apparatus, the cable terminating at respective ends thereof at corresponding ones of a first shaped cam and a second shaped cam each of which is operably coupled to respective ones of a first axle rod and a second axle rod, the first and second axle rods being rotatably connected to respective ones of the front wheels, the first and second shaped cams causing movement of the front wheels based on movement of the cable responsive to rotation of the steering shaft; and
 providing at least one set of guide pulleys to receive respective different portions of the cable to guide the cable to respective ones of the first and second shaped cams.

20. The method of claim 19, wherein the first and second shaped cams are each substantially triangular shaped cams having a relatively shorter base portion and two longer leg portions, a rear most one of the two longer leg portions being configured to receive the cable from the at least one set of guide pulleys, and wherein rotation of the steering shaft causes an amount of cable to be pulled away from the first shaped cam based on a magnitude of a steering input provided at the steering apparatus, and causes an equal amount of cable to be taken up by the second shaped cam, and wherein less rotational movement of the second shaped cam is required to take up the equal amount of cable compared to rotational movement of the first shaped cam to provide the amount of cable.

* * * * *